United States Patent [19]

Ritcey et al.

[11] 3,718,458
[45] Feb. 27, 1973

[54] LIQUID-LIQUID SEPARATION OF COBALT FROM AMMONIACAL SOLUTIONS

[75] Inventors: Gordon Malcolm Ritcey; Bernard Henry Lucas, both of Ottawa, Ontario, Canada

[73] Assignee: Canadian Patents and Development Limited, Ottawa, Ontario, Canada

[22] Filed: Jan. 26, 1971

[21] Appl. No.: 109,899

[52] U.S. Cl..................75/119, 75/101 BE, 75/103
[51] Int. Cl. ..............................C22b 23/04
[58] Field of Search..75/101 BE, 119; 23/312 R, 312 ME

[56] References Cited

UNITED STATES PATENTS

| | | | |
|---|---|---|---|
| 3,380,801 | 4/1968 | Williams et al. | 75/101 BE UX |
| 3,532,490 | 10/1970 | Burkin | 75/101 BE UX |
| 3,399,055 | 8/1968 | Ritcey et al. | 75/119 |
| 3,514,267 | 5/1970 | Sherrington et al. | 23/312 |
| 3,575,687 | 4/1971 | Drobnick et al. | 23/22 |

*Primary Examiner*—G. T. Ozaki
*Attorney*—Peter Kirby, Charles P. Curphey and Norris M. Eades

[57] ABSTRACT

A process for separating cobalt from an aqueous ammoniacal solution in which metals are dissolved, the solution containing at least 50 grams/liter of an ammoniacal salt and the cobalt being in the cobaltous form. The solution at pH 7-9 is contacted with a tertiary, mono-carboxylic acid of the formula

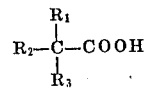

wherein $R_1$, $R_2$ and $R_3$ are alkyl groups and the molecular chain contains 6-19 carbon atoms, preferably dissolved in an inert organic diluent. The cobalt values are extracted from the aqueous phase to the organic extract phase and the resultant cobalt loaded organic phase is separated from the remaining aqueous raffinate phase containing, for example, the nickel in solution.

12 Claims, 1 Drawing Figure

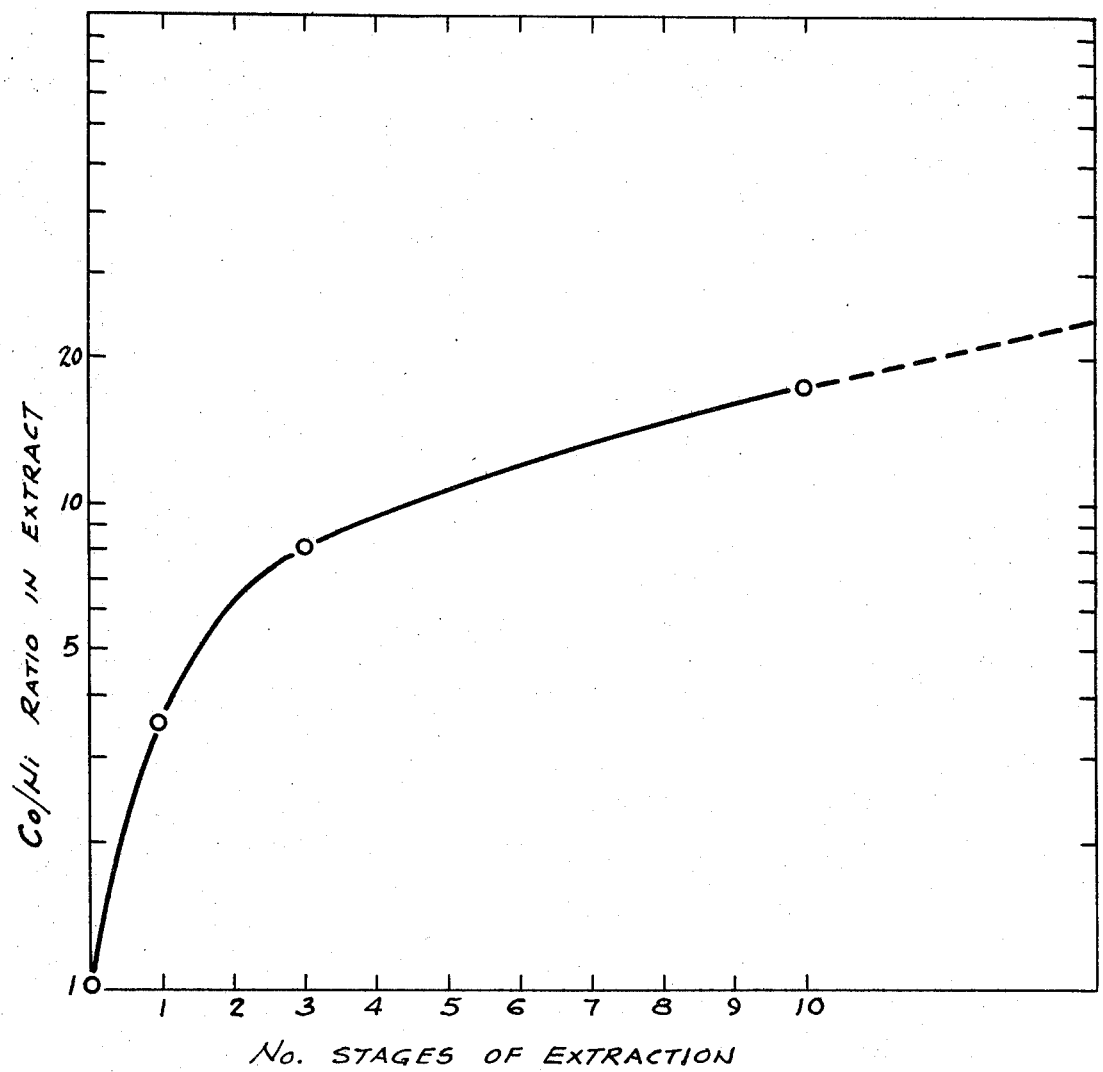

LIQUID-LIQUID SEPARATION OF COBALT FROM AMMONIACAL SOLUTIONS

BACKGROUND OF THE INVENTION

1. Field of the Invention

This invention relates to a solvent extraction process for separating cobalt from an ammoniacal solution in which it is dissolved, particularly from an ammonium sulphate leach solution containing dissolved cobalt and nickel.

2. Description of the Prior Art

Nickel sulphide ores are at present commercially processed by pressure leaching at elevated temperatures using ammonium hydroxide. Subsequently, dissolved copper, nickel and cobalt are recovered from this leach solution by precipitation techniques involving several unit processes as well as many pieces of equipment.

The copper is removed by distillation and hydrogen sulphide precipitation. The copper-free solution is then oxidized, and the nickel is precipitated by hydrogen reduction at 350°F. The resultant barren solution containing about 1 g/l each of cobalt and nickel, and about 500 g/l $(NH_4)_2SO_4$ is contacted with hydrogen sulphide at atmospheric pressure in order to precipitate the residual nickel and cobalt.

The cobalt is recovered from this mixed-sulphide precipitate in several stages. First, the sulphides are dissolved in dilute sulphuric acid under oxidizing conditions. The nickel is removed by precipitation as nickel ammonium sulphate, and the cobalt is recovered from the solution by precipitation of the metal powder at elevated temperatures and pressures.

The above system for separating cobalt from nickel in the barren solution has several disadvantages. Firstly, many process steps are necessary to achieve pure nickel or cobalt and many pieces of process equipment as well as a relatively large processing area are required.

It has previously been proposed in Ritcey et al., U.S. Pat. Nos. 3,399,055 and 3,438,768 to separate cobalt and nickel from sulphate solutions by solvent extractions. However, with the extraction reagents used, the workable pH range was either about 5 to 6 or 11 to 12 and a salt content of greater than about 59 g/l $(NH_4)_2SOB4$ could not be tolerated.

In Drobnick et al., U.S. Pat. No. 3,276,863, issued Oct. 4, 1966, there is a proposal to use alpha-hydroxy oximes to extract and separate nickel from cobalt in alkaline solutions after prior oxidation of the cobalt.

It has also been proposed in British Pat. No. 959,813 to use certain carboxylic acids for the separation of nickel and cobalt in a dilute ammonium sulphate solution. However, with a 50 g/l solution of ammonium sulphate at pH 7.4, very poor separation was achieved.

Little has been published on the extraction and separation of cobalt from nickel in an alkaline solution having a high salt content, except for Williams et al., U.S. Pat. No. 3,380,801. This patent described the use of oleic acid for separating cobalt from nickel in ammoniacal chloride solutions.

It is the object of the present invention to provide a simple and commercially acceptable liquid-liquid extraction process for separating cobalt from nickel in an alkaline, concentrated ammoniacal solution in which the nickel and cobalt are dissolved.

SUMMARY OF THE INVENTION

According to this invention, it has been found that cobalt can be preferentially extracted from a concentrated ammoniacal solution containing dissolved cobalt and nickel by liquid-liquid separation, using as solvent extraction reagent, a tertiary, mono-carboxylic acid usually dissolved in an inert organic diluent. During the extraction, the organic phase is preferentially loaded with cobalt while the nickel remains in the raffinate.

The two phases are then separated and cobalt is recovered from the organic phase and can be converted to a salt, or to the oxide or metal powder. The nickel is removed from the raffinate by any suitable technique, e.g., liquid-liquid extraction or sulphide precipitation, and the ammonium salt is recovered.

The tertiary, mono-carboxylic acids used as extraction reagents in the process of this invention have the general formula

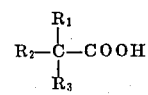

where $R_1$, $R_2$ and $R_3$ are alkyl groups. The acids must contain more than five carbon atoms in the longest molecular chain, preferably at least nine carbon atoms and may contain up to 19 carbon atoms. Particularly preferred acids are those containing 9–11 carbon atoms in the molecular chain. It is also preferred that at least one of $R_1$, $R_2$ and $R_3$ is methyl and that the alkyls are straight chain groups. The water solubility of the acids should be low to avoid losses in the raffinate or on stripping. Mixtures of the acids may also be used.

These acids can be conveniently obtained by reacting olefins, water and carbon monoxide in the presence of a strong acid catalyst. Cracked wax olefins are preferred as the olefin source. Processes for producing these acids are described in Brennstoff - Chemie 1955, 36, 321 as well as in British Pat. Specifications Nos. 743,597, 798,065, 871,278 and 883,142.

A wide variety of organic diluents in which the extraction reagent is preferably dissolved, can be used according to the invention. The minimum requirements of the diluent that is used is that it be substantially water-immiscible, that it will dissolve the extraction reagent, and that it will not interfere with the function of the reagent in extracting the cobalt values from aqueous cobalt and nickel-bearing solutions. The diluent can be an aliphatic or aromatic hydrocarbon, halogenated hydrocarbon, petroleum derivative, ether, etc. Examples of these diluents include toluene, carbon tetrachloride, benzene, 2-ethyl-hexanol, etc. The preferred diluent has been found to be kerosene.

Contacting the cobalt and nickel-bearing aqueous solution with the solvent extraction reagent may be carried out by any of the well-known procedures employed in liquid-liquid extractions. Although continuous countercurrent methods are preferred, batch, continuous batch, and batch countercurrent methods are also useful. Any suitable liquid-liquid contacting system may be employed such as a pulse column, a countercurrent rotating disc column, and the like. The temperature at which the mixing and extraction is carried out is not critical but advantageously the temperature is maintained in the range of about 20° to 40°C.

The pH of the aqueous medium can be varied somewhat but is preferably in the region of about 7–9. At about pH 8, the maximum separation of cobalt and nickel is obtained.

Although the process of this invention is particularly concerned with separating cobalt from nickel in concentrated ammonium sulphate solutions, other salts such as nitrates or carbonates can be used. The salt concentration of these solutions can be varied over a wide range. Thus, the salt concentration of the ammonium sulphate solution may vary from about 50 grams per liter up to the saturation point (about 531 grams $(NH_4)_2SO_4$ per liter). In order to maintain a good separation factor between the cobalt and nickel, the $(NH_4)_2SOB4$ concentration should preferably be kept above 150 g/l and for maximum separation the concentration is maintained above 250 g/l.

The ammoniacal feed solution will normally contain about 0.1 to 50 g/l of cobalt and about 0.1 to 50 g/l of nickel, but these concentrations are not critical.

It is particularly important according to this invention that the cobalt be maintained in the cobaltous form. If the cobalt is allowed to oxidize to the cobaltic form a very significant decrease in the separation factor for cobalt and nickel results.

The ratio of the volume of organic phase to the aqueous phase can be varied considerably and the most efficient ratio in each case can be readily determined by one skilled in the art. However, generally the aqueous to organic ratio will be within the range of about 1/5 to 5/1, depending on the metal concentration, concentration of extraction reagent, etc.

After the cobalt values have been transferred to the organic phase and the aqueous and organic phases separated, the organic phase is transferred to a scrubber of known design to remove residual nickel. The amount of this residual nickel can be kept to a very low level during extraction by stagewise contact with the tertiary, mono-carboxylic acid, e.g., in a pulse column where many stages of contact are inherently available. In the scrubber the organic phase is advantageously contacted with a 5–50 g/l cobalt sulfate solution containing 300–500 g/l ammonium sulphate at about pH 8.

After the scrubbing, the cobalt-containing organic phase is transferred from the scrubber to a stripping circuit, which can be any suitable liquid-liquid contactor. In the stripping circuit the cobalt-containing organic phase can be conveniently contacted with a mineral acid solution, e.g., sulphuric, nitric or hydrochloric acid, the choice of acid depending on the cobalt salt required. The cobalt is readily stripped from the solution by use of these acids and nitric and sulphuric acids have been found to be particularly effective. When the organic phase is contacted with the acid solution, the metal value dissolves in the acid (as the corresponding metal salt) and the tertiary, mono-carboxylic acid is reformed and may therefore be used for extracting fresh feed solution.

The cobalt can be collected as a cobalt salt or it can be converted to the oxide and, if desired, the oxide can be reduced to cobalt powder.

The nickel can be recovered from the raffinate phase by a variety of methods, such as solvent extraction, sulphide precipitation and crystallization, and the remaining ammonium sulphate solution can be separated and recovered.

The invention is illustrated by the following non-limitative examples.

EXAMPLE 1 (Extraction)

A series of extraction tests were performed on a solution containing 1 g/l Ni, 1 g/l Co and 531 g/l $(NH_4)_2SO_4$, using as extraction reagent a tertiary, mono-carboxylic acid available from Shell Chemical Company under the trademark VERSATIC 911. The reagent was made up as a 10 percent solution dissolved in kerosene.

Using this reagent solution, a series of bench shake-outs were conducted at an aqueous/organic ratio of 1/1 and varied pH values. Each shake-out was of 2 minutes duration at room temperature.

The results were as follows:

Table I

| Feed pH | Extraction % | | $E_a^o$ | | Separation Factor |
|---|---|---|---|---|---|
| | Co | Ni | Co | Ni | Co/Ni |
| 7.5 | 51.8 | 22.9 | 3.23 | 0.89 | 3.6 |
| 8.0 | 50.4 | 17.0 | 3.06 | 0.61 | 5.0 |
| 8.5 | 24.8 | 12.0 | 0.99 | 0.41 | 2.4 |

The results show that with an increase in pH from 7.5 to 8.5 the extraction coefficients ($E_a^o$) of $Co^{++}$ and Ni decrease. Also, the maximum separation of $Co^{++}$/Ni occurs at pH 8.0, where the separation factor is 5.0.

EXAMPLE 2 (Extraction)

Extraction tests were carried out using the same extraction reagent solution as in Example 1 to determine the change in oxidation state of the cobalt in the feed solution with time and the effect of this change of the subsequent extraction and separation of cobalt and nickel. The solvent was contacted at an aqueous/organic ratio of 3/1 with a feed solution containing 1.13 g/l Ni and 1.11 g/l Co at a pH of 8.0.

The results are shown in Table II below:

Table II

| Aging Time | Emf | Extraction % | | $E_a^o$ | | Separation Factor |
|---|---|---|---|---|---|---|
| Hours | mv | Co | Ni | Co | $E_a^o$ Ni | $E_a^o$ Co/$E_a^o$ Ni |
| 1.5 | +58 | 65 | 15 | 5.5 | 0.53 | 10.8 |
| 4.0 | +72 | 61 | 10 | 4.7 | 0.32 | 14.7 |
| 73 | +120 | 59 | 13 | 4.4 | 0.46 | 9.5 |
| 100 | +220 | 58 | 17 | 4.2 | 0.61 | 6.9 |

The results show that increased aging of the feed up to 100 hours results in an increase in the oxidation state of the cobalt, as well as a decrease in the separation factor for cobalt-nickel from 10.8 to 6.9.

EXAMPLE 3 (Extraction)

A series of extractions were conducted to determined whether stagewise contact with the tertiary, mono-carboxylic acid would decrease the amount of residual nickel in the organic phase. The extractions were conducted on a feed solution containing 1.1 g/l Co, 1.1 g/l Ni and 531 g/l $(NH_4)_2SO_4$ at a pH of 8. The extraction reagent was a 10 percent solution of VER- SATIC 911 in kerosene and the aqueous/organic ratio was 3/1.

The results of ten stages of contact are shown graphically in the FIGURE. From this graph it will be seen that the Co/Ni ratio was only 3.5 after one contact, while this ratio had increased to 17 after 10 contacts. This clearly shows that stagewise contact is highly effective in decreasing the amount of residual nickel in the organic phase.

EXAMPLE 4 (Scrubbing)

Scrubbing tests were conducted on a loaded VERSATIC 911 extract solution containing 1.86 g/l Co and 0.3 g/l Ni. In these tests the loaded extract was contacted with various ammonium sulphate scrub solutions containing 30–50 g/l $Co^{++}$ and having concentrations of ammonium sulphate in the range of 100 to 500 g/l. The extract was contacted three times with each scrub solution at pH 8 and an aqueous/organic ratio of 1/1.

After scrubbing, the extract was stripped with 15% $H_2SO_4$ for analysis.

The results in Table III show that although the cobalt/nickel ratio is increased from about 6 in the loaded extract to 30 using a scrub solution containing 100 g/l $(NH_4)_2SO_4$, a much higher purification level can be obtained with a scrub solution containing 300–500 g/l $(NH_4)_2SO_4$.

Table III

| Composition of Scrub Solution (g/l) | | | Co/Ni Ratio in Strip Solution |
|---|---|---|---|
| Co | Ni | $(NH_4)_2SO_4$ | |
| 42.6 | 6.0 | 100 | 30 |
| 47.1 | | 300 | 3900 |
| 32.0 | | 500 | 5400 |

EXAMPLE 5 (Stripping)

Stripping tests were conducted on a VERSATIC 911 extract solution containing 1.88 g/l Co and 0.18 g/l Ni. Varying concentrations of nitric, hydrochloric and sulphuric acid were used with an aqueous/organic ratio of 1/1. The stripping was conducted at room temperature and the contact time was 2 minutes.

The results are given in Table IV below:

Table IV

| Stripping Solution | 1st stage Co | 1st stage Ni | 2nd stage Co | 3rd stage Co | 4th stage Co |
|---|---|---|---|---|---|
| HCl | | | | | |
| 2% | 70 | | | | |
| 5 | 90 | | | | |
| 10 | 90 | | | | |
| 20 | 90 | | | | |
| $HNO_3$ | | | | | |
| 2% | 87 | | | | |
| 5 | 96 | | | | |
| 10 | 96 | | | | |
| $H_2SO_4$ | | | | | |
| 5% | 95 | | 99.0 | 99.7 | 99.9 |
| 15 | 96 | | 99.3 | 99.9 | |

EXAMPLE 6 (Effects of Other Anions)

A series of extraction tests were performed to determine the effects of anions other than sulphate on the separation of cobalt from nickel. The extractions were conducted on feed solutions containing 1 g/l Co, 1 g/l Ni and 300 g/l of $NH_4NO_3$, $(NH_4)_2CO_3$ or $(NH_4)_2SO_4$ at a pH of 8. The extraction reagent was a 10 percent solution of VERSATIC 911 in kerosene and the aqueous/organic ratio was varied at 1/1, 3/1 and 5/1.

The extracts were stripped with 10% $HNO_3$ at an aqueous/organic ratio of 1/1 for comparison of extraction values. The results obtained are shown in Table V below.

Table V

| Anion | A/O Ratio | Equil. pH | $HNO_3$ Strip Sol'n (g/l) Co | $HNO_3$ Strip Sol'n (g/l) Ni | Total Metal Loading (g/l) | Co/Ni Ratio in Strip |
|---|---|---|---|---|---|---|
| $NO_3^-$ | 1/1 | 7.7 | 0.86 | 0.72 | 1.56 | 1.2 |
| | 3/1 | 7.8 | 2.38 | 0.62 | 3.00 | 3.8 |
| | 5/1 | 7.9 | 2.80 | 0.42 | 3.22 | 6.7 |
| $SO_4^-$ | 1/1 | 8.0 | 0.80 | 0.45 | 1.75 | 2.0 |
| | 3/1 | 8.0 | 1.9 | 0.65 | 2.55 | 2.9 |
| | 5/1 | 8.0 | 2.5 | 0.70 | 3.20 | 3.6 |
| $CO_3^-$ | 1/1 | 8.0 | 0.70 | 0.40 | 1.10 | 1.75 |
| | 3/1 | 8.0 | 1.10 | 0.44 | 1.54 | 2.5 |
| | 5/1 | 8.0 | 1.40 | 0.48 | 1.88 | 2.9 |

We claim:

1. A process for separating cobalt from an aqueous ammoniacal solution containing dissolved cobalt and nickel, the solution having a concentration of at least 50 grams ammonium salt per liter and the cobalt being in the cobaltous form, which comprises contacting said aqueous solution at pH 7–8.5 with a tertiary, mono-carboxylic acid of the formula:

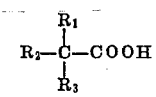

wherein $R_1$, $R_2$ and $R_3$ are alkyl groups and the longest molecular chain contains 6–19 carbon atoms whereby the cobalt values are extracted from the aqueous phase to the organic extract phase, and separating the resultant cobalt loaded organic phase from the remaining aqueous raffinate phase containing the nickel in solution.

2. A process according to claim 1 wherein the ammonium salt is ammonium sulphate.

3. A process according to claim 2 wherein the tertiary, mono-carboxylic acid is dissolved in an inert organic diluent which is substantially immiscible with the aqueous solution.

4. A process according to claim 3 wherein the tertiary, mono-carboxylic acid contains 9–11 carbon atoms in the molecular chain.

5. A process according to claim 2 wherein the extraction is conducted at about pH 8.

6. A process according to claim 2, wherein the ammonium sulphate solution has a concentration above 150 g/l.

7. A process according to claim 2, wherein the ammonium sulphate solution has a concentration above 250 g/l.

8. A process according to claim 2, wherein the ammonium sulphate solution contains 0.1 to 50 g/l cobalt and 0.1 to 50 g/l nickel.

9. A process according to claim 2 wherein a multiple stagewise contact with the tertiary, mono-carboxylic acid is used.

10. A process according to claim 2 wherein the cobalt loaded organic phase is scrubbed with a cobalt ammonium sulphate solution to remove residual nickel.

11. A process according to claim 2 wherein the cobalt is stripped from the loaded organic phase by being contacted with a mineral acid solution.

12. A process according to claim 11 wherein the mineral acid is sulphuric, nitric or hydrochloric acid.

* * * * *